United States Patent
Sakamaki et al.

(10) Patent No.: US 7,100,030 B1
(45) Date of Patent: Aug. 29, 2006

(54) SYSTEM FOR IDENTIFYING, BASED ON SETUP USE HISTORY, AND DISPLAYING A SETUP OF A SYSTEM TO INDICATE ENABLED AND DISABLED SETTING ITEMS TO A USER

(75) Inventors: Kenji Sakamaki, Inagi (JP); Masahiro Saito, Kawasaki (JP); Michisaburou Kihara, Sagamihara (JP); Kayo Mizutani, Higashikurume (JP)

(73) Assignee: Fujitsu Limited, Kawasaki (JP)

( * ) Notice: Subject to any disclaimer, the term of this patent is extended or adjusted under 35 U.S.C. 154(b) by 531 days.

(21) Appl. No.: 09/758,376

(22) Filed: Jan. 12, 2001

(30) Foreign Application Priority Data

Jan. 12, 2000 (JP) .............................. 2000-003921

(51) Int. Cl.
 *G06F 9/24* (2006.01)

(52) U.S. Cl. ........................... 713/1; 713/100; 345/902

(58) Field of Classification Search .................... 713/1, 713/2, 100; 345/902
See application file for complete search history.

(56) References Cited

U.S. PATENT DOCUMENTS

| 4,970,683 | A | * | 11/1990 | Harshaw et al. ............ 715/841 |
| 5,454,074 | A | * | 9/1995 | Hartel et al. ................ 715/710 |
| 5,862,351 | A | * | 1/1999 | He ............................. 710/104 |
| 5,996,072 | A | * | 11/1999 | Noll et al. ..................... 713/1 |
| 6,317,828 | B1 | * | 11/2001 | Nunn ............................ 713/2 |

FOREIGN PATENT DOCUMENTS

| JP | 04102929 A | * | 4/1992 |
| JP | 08083203 | | 3/1996 |
| JP | 10187565 | | 7/1998 |
| JP | 10283209 | | 10/1998 |
| JP | 11143691 A | * | 5/1999 |

* cited by examiner

*Primary Examiner*—Thuan Du
(74) *Attorney, Agent, or Firm*—Staas & Halsey LLP (57) ABSTRACT

A computer that can easily identify which setting items are enabled and which setting items are not enabled when conducting setup setting operations, and can efficiently conduct correct setup. Setup history information is stored when the use environment settings are executed in the computer, the user and/or others can identify and display in an easily recognizable state the setting items from among many setting items in which the setting values set during the setup setting operation are not reflected in the use environment of the computer.

20 Claims, 5 Drawing Sheets

( PRIOR ART )

FIG. 4

( PRIOR ART )

Power Savings: [Customized]
  Hard Disk Timeout: [Off]
  Video Timeout: [Off]
  Standby Timeout: [4 Minutes]
  Auto Suspend Timeout: [15 Minutes]

Suspend Mode: [Suspend]
  Auto Save To Disk: [Off]

Resume On Modem Ring: [Off]
Resume On Time: [Off]
Resume Time: [00:00:00]

| DATA_No. | NAME OF SETTING | |
|---|---|---|
| 00 | NONE | — |
| 01 | HARD DISK TIMEOUT | THE TIME IS SET UP TO WHEN THE HARD DISK MOTOR WILL BE STOPPED IF THERE IS NO ACCESS TO THE HARD DISK FOR A FIXED TIME. |
| 02 | VIDEO TIMEOUT | THE TIME IS SET UP TO WHEN THE DISPLAY OF THE DISPLAY DEVICE (LIQUID CRYSTAL/CRT) WILL BE EXTINGUISHED IF THERE IS NO DATA INPUT FROM THE KEYS OR MOUSE FOR A FIXED TIME. |
| 03 | IDLE MODE | WHETHER OR NOT THE TO USE THE IDLE MODE (STATE IN WHICH THE SPEED OF THE CPU CLOCK IS AUTOMATICALLY DROPPED) IS SET WHEN THERE IS NO KEY/MOUSE INPUT OR DATA INPUT/OUTPUT FOR A FIXED TIME. |
| 04 | STANDBY TIMEOUT | THE TIME IS SET UP TO WHEN STANDBY MODE (STATE IN WHICH THE DISPLAY DEVICE DISPLAY IS EXTINGUISHED AND THE HARD DRIVE IS STOPPED) WILL BE ENTERED IF THERE IS NO DATA INPUT FROM THE KEYS OR MOUSE FOR A FIXED TIME. |
| 05 | AUTO SUSPEND TIMEOUT | THE TIME IS SET UP TO WHEN MOVING TO SUSPEND MODE (DISPLAY ON THE DISPLAY DEVICE IS EXTINGUISHED, THE HARD DRIVE IS SUSPENDED, AND THE CPU IS STOPPED) IS ENTERED. |

FIRST BYTE  SECOND BYTE  THIRD BYTE          255TH BYTE

| 04 | 05 | 00 | ... | 00 |

FIG. 7

SYSTEM FOR IDENTIFYING, BASED ON SETUP USE HISTORY, AND DISPLAYING A SETUP OF A SYSTEM TO INDICATE ENABLED AND DISABLED SETTING ITEMS TO A USER

CROSS REFERENCE TO RELATED APPLICATIONS

This application is based upon and claims priority of Japanese Patent Application No. 2000-003921, filed Jan. 12, 2000, the contents being incorporated herein by reference.

BACKGROUND OF THE INVENTION

1. Field of the Invention

The present invention is related to a computer having a setup function setting device for setting the use environment of the computer (referred to hereinafter as "setup"), and, more particularly, the present invention is related to a computer wherein an operator of the computer (referred to hereinafter as "user") can set the use environment by him/herself.

2. Description of the Related Art

Computers are conventionally provided with a setup function by which the user can set up the hardware environment. Recently, many functions that did not previously exist in conventional personal computers have been added to the setup functions of personal computers.

An example of setup functions of a notebook personal computer will be described below. A notebook personal computer is a small-size, lightweight portable personal computer. The notebook-type portable personal computer was developed mainly for uses such as connecting to a network from an external destination. When the notebook-type personal computer (PC) is used at an external destination, the environment differs from an office where ordinary computers are used, and often there is no convenient power supply source. As a result, batteries often power the notebook-type of personal computer, and a variety of techniques have been used to extend the length of usable battery time. An example of a technique used to extend the length of usable battery time is to have an energy-saving function that reduces the amount of power consumption and extends the usable battery time.

Furthermore, in addition to the energy-saving function, security functions are also used to prevent information leaks when the notebook-type PC is connected to the network via external destination points.

Accordingly, many functions have been recently added to computers that did not exist in conventional computers. As a result, when performing setup, it is necessary to setup many items that include the power saving functions and security functions.

Furthermore, in the past, the display screens generally used during setup were display screens controlled by a Basic Input Output System (BIOS) program (hereinafter referred to as a "BIOS setup screen"). BIOS, which is normally stored in read-only memory (ROM), is a computer activation program that initiates operations when the power is turned on, and that conducts the most basic processing in relation to the hardware.

However, the general user does not ordinarily use the BIOS setup screen. Therefore, unless a highly trained personal computer user is operating the personal computer, it is very difficult to conduct the setup operations by oneself from the BIOS setup screen.

To simplify setup, commercial products have recently appeared that have functions to set the setup settings from display screens controlled by an operating system (referred to hereinafter as "OS") or by an application program (referred to hereinafter as "application") for some of the setup setting items, such as the energy saving function.

Figure 4:
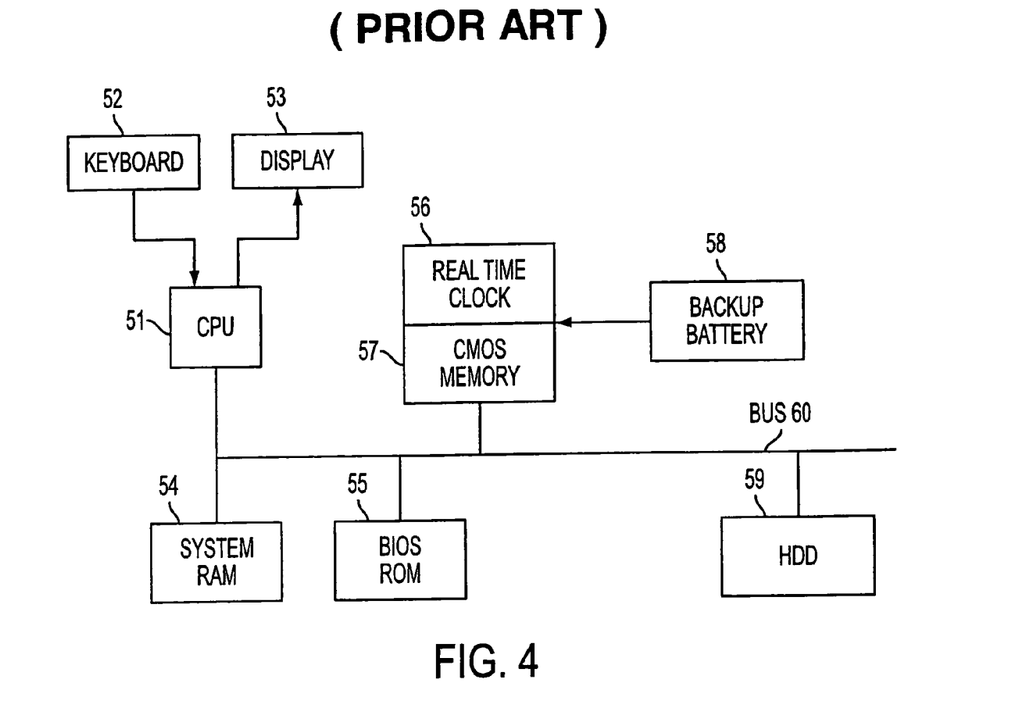
FIG. 4 is a block diagram of a hardware configuration of a conventional computer.
Figure 5:
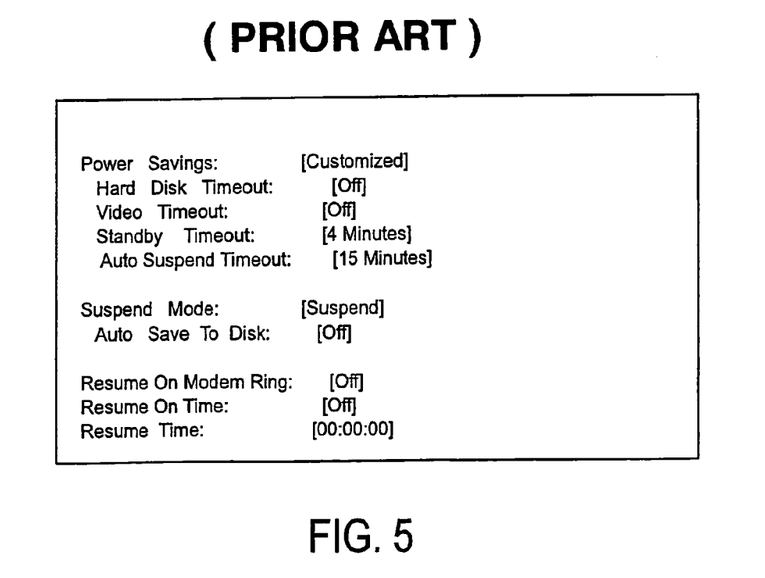
FIG. 5 is an example of a conventional setup screen.

FIG. 4 is a block diagram of a conventional computer hardware configuration, and FIG. 5 is an example of a conventional BIOS setup screen.

As shown in FIG. 4, the computer hardware is mutually connected via a bus 60, and is provided with a central processing unit (CPU) 51 that controls all systems, a keyboard 52, a mouse (not shown in FIG. 4), a display device 53 for display, a system random access memory (SRAM) 54 used when operating the applications, a BIOS ROM 55 in which the BIOS program is stored, a ROM (not shown in the figure) to store a real time clock 56 operating as a timer, a CMOS memory 57 to store setting values relating to the BIOS setup, a backup battery 58 to supply power to the real time clock 56 and CMOS memory 57, a hard disk drive (HDD) 59 in which programs, such as the OS and applications, and data are stored, a floppy disk drive (FDD) (not shown in the figure), a compact disk-ROM (CD-ROM) drive (not shown in the figure), a communications control device (not shown in the figure), and various interface circuits (not shown in the figure).

Figure 6:
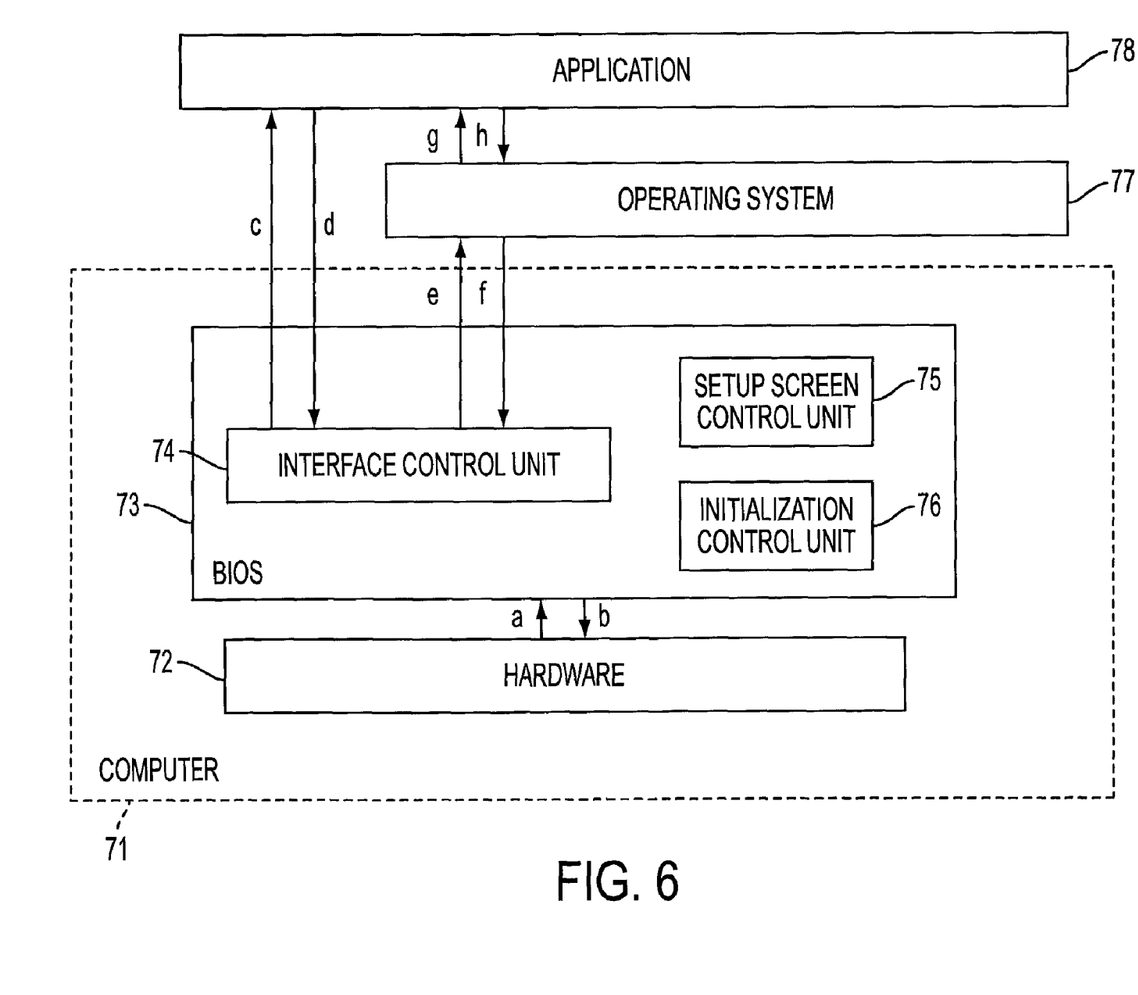
FIG. 6 is a block diagram of the relationship between the software and the hardware of a computer in accordance with the present invention.

The interface relationships between the computer hardware shown in FIG. 4 and software, such as the applications, OS and BIOS, are shown in FIG. 6. As shown in FIG. 6, a BIOS 73 has an interface (arrows a, b) to control the computer hardware 72, and directly controls the hardware 72. Moreover, the BIOS 73 also has an interface (arrows c, d, e, f) with the software that operates on the BIOS, such as the OS 77 and application 78. As shown in FIG. 6, the OS 77 that operates on the BIOS controls the hardware 72 through the BIOS 73. Furthermore, the BIOS 73 includes an interface control unit 74 that interfaces with the input devices, etc., a setup screen control unit 75 that controls the setup screen, and an initialization control unit 76 that conducts power on self test (POST) processing.

The application 78 can indirectly access the BIOS 73 (arrows e, f, g, h) through the OS 77, and has direct access to the BIOS 73 (arrows c, d) without going through the OS 77.

As described above, the hardware 72 can be set from the display screen controlled by the OS 77 or set from the display screen controlled by the application 78. In either case, the contents of these settings are always transmitted to the hardware 72 after having passed through the BIOS 73.

The type of computer does not specifically determine the type of setup method. This is because, of the various setting items, in addition to being able to make the settings from the BIOS setup screen, some setting items may be set from display screens controlled by the OS 77 or the application 78. Further, some setting items, which may be set only from the BIOS setup screen, cannot be set from the display screens controlled by the OS 77 or application 78, and depend on the BIOS specification or the OS and application specification that are operated on the BIOS 73.

For example, if there is no access to the hard disk for a fixed time, a hard disk timeout function that sets the time up to when the hard disk motor is stopped may be configured as described below.

The hard disk timeout function settings for personal computers that operate with Microsoft MS-DOS can be set only from the BIOS setup screen, and those set values are enabled. In contrast, for personal computers that operate with Microsoft Windows 95 or Microsoft Windows 98, in addition to settings from the BIOS setup screen, it is possible to make settings from the display screen controlled by Windows 95 or Windows 98 ("Windows" is a registered trademark of the Microsoft Corporation). Of the various setting values, the one having the shortest time is enabled. Moreover, if there is no keyboard input or data input for a fixed time, the display is automatically canceled, and the hard disk enters the standby state.

An auto-suspend timeout function to stop the CPU 51 is configured as described below. In personal computers that operate with Microsoft MS-DOS or Windows 95, the auto-suspend timeout function settings are possible only from the BIOS setup screen, and those setting values are enabled. In contrast, in personal computers that operate with Windows 98, in addition to making settings from the BIOS setup screen, it is possible to make settings from the display screen that is controlled by Windows 98. In this case, the settings from the BIOS setup screen are disabled, and only the setting values from the display screen controlled by the OS (Windows 98) are enabled.

Nonetheless, the setup method described above is only listed in the BIOS operating manual and, as shown in FIG. 5, the BIOS setup screen does not identify and display whether or not the setup settings are actually enabled. Because the BIOS setup screen does not identify whether the settings are actually enabled, for example, if a new version of the OS or the application is installed, there may be setting items (referred to hereinafter as "substitutable setting items") which have been modified from the setting contents that were set from the setup screen controlled by the BIOS, and the settings set from the display screens controlled by the OS or the application have priority. A user who is only experienced performing setup with the BIOS setup screen may not know this fact. In this case, the user performs setup by the same operational method as before, but the desired setting values are not achieved.

The specific process by which the setup is executed in relation to the hardware when turning on the power supply will be described below. In the discussion below, it will be assumed that Windows 98 is the operating system.

Because the BIOS is used when the power is turned on, the BIOS executes the environmental settings in relation to the hardware in accordance with the setting values for setup that are pre-stored in memory (referred to hereinafter as the "BIOS setting values"). After the setup based on the BIOS setting values is complete, the OS is activated. In the process of the OS being activated to set the "hard disk timeout function" or the "auto-suspend timeout function," the OS directs the BIOS to overwrite the BIOS setting values that were once set in relation to the hardware with setting values from the display screen controlled by the OS, and the hardware settings are overwritten. As a result, the environmental settings that were actually executed produce a state that is completely different from the setting values desired by the user.

If the user notices this state and attempts to reset the setting values from the BIOS setup screen, the user has to restart the power source and open the BIOS setup screen once again. Nonetheless, the BIOS setting values that were previously set by the user him/herself from the BIOS setup screen will be displayed on the BIOS setup screen. The set values of the use environment in the period immediately prior to turning on the power source (referred to hereinafter as the "prior power source cycle") will not be displayed on the BIOS setup screen. For this reason, the user mistakenly thinks that some kind of trouble has occurred in relation to the difference between the set values and the actual environmental settings, and performs the wrong countermeasures. As a result of these inappropriate countermeasures, a problem arises in that the correct setup may not be executed.

Even assuming the user knows that there are substitutable setting items among the setting items displayed on the BIOS setup screen, if the setup is conducted correctly, it is necessary to look at a manual or to seek out a trained person to confirm which setting items are substitutable by the OS or by an application, and an effective process does not occur.

Conducting the setting operations for the computer setup as described above takes a long time, and places a large burden on a user who wants to set the setup settings effectively in a short period of time.

SUMMARY OF THE INVENTION

The present invention is related to a computer having a setup setting operation wherein the user can easily determine which setting items are enabled, and which setting items are not enabled, and can efficiently execute a correct setup.

In accordance with the present invention, the setting items set at the time of the setting operation that are not reflected in the use environment of the computer (hereinafter referred to as the "setting items that are not reflected") are displayed in a state a user can recognize. More specifically, the setting items that are not reflected are displayed by storing setup history information when the setting items of the use environment are executed by the computer, and by accessing and using that information as necessary.

In accordance with the present invention, the user and/or others can immediately recognize operation that setting items that are not reflected exist from a display screen for conducting the setup setting.

As a result, the user and/or others can make effective settings by being aware that the setting values of setting items that are identified and displayed as setting items that are not reflected on that display screen where the setup setting operation is being conducted can be set from the setting screens controlled by other software, that is, software other than that used in the setup setting operation. Moreover, the user can effectively set setting items because the user is aware that there is the possibility that the setting values of the setting items identified and displayed as setting items that are not reflected are not reflected as is in the use environment due to a variety of factors. For example, the setting items may not be reflected in the use environment because they have been replaced by setting values from a setting screen controlled by other software, or functions for those settings do not exist on the hardware side.

In accordance with the present invention, setup history information is stored in memory when executing the settings of the use environment for the computer, and the setting items that are not reflected can be identified and displayed based on the setup history information.

Once the setup history information is stored, it can be recalled and used as necessary. Therefore, if there is the possibility that the setting items that are not reflected are controlled by settings of the user and/or others, and then changed every power source cycle, the setup history information for each power source cycle can be automatically known, and the setting items that are not reflected (e.g., setting items that fluctuate every power source cycle or the like) are identified and displayed in a state that the user can recognize.

In accordance with the present invention, the setting items that are not reflected may be items that are set from a setup setting screen controlled by software other than the software used in the setup setting operation.

In accordance with the present invention, the user and/or others immediately recognizes from the screen display on which the setup setting operation is conducted that there are settings that are not reflected, and the user and/or others is clearly aware that the setting items that are not reflected are items that were set from a setup setting screen controlled by software other than the software used in that setting operation. Accordingly, it is possible to effectively conduct a correct setup with respect to the setting items that are not reflected specifically by setting them from a setup setting screen controlled by the other software.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 1:
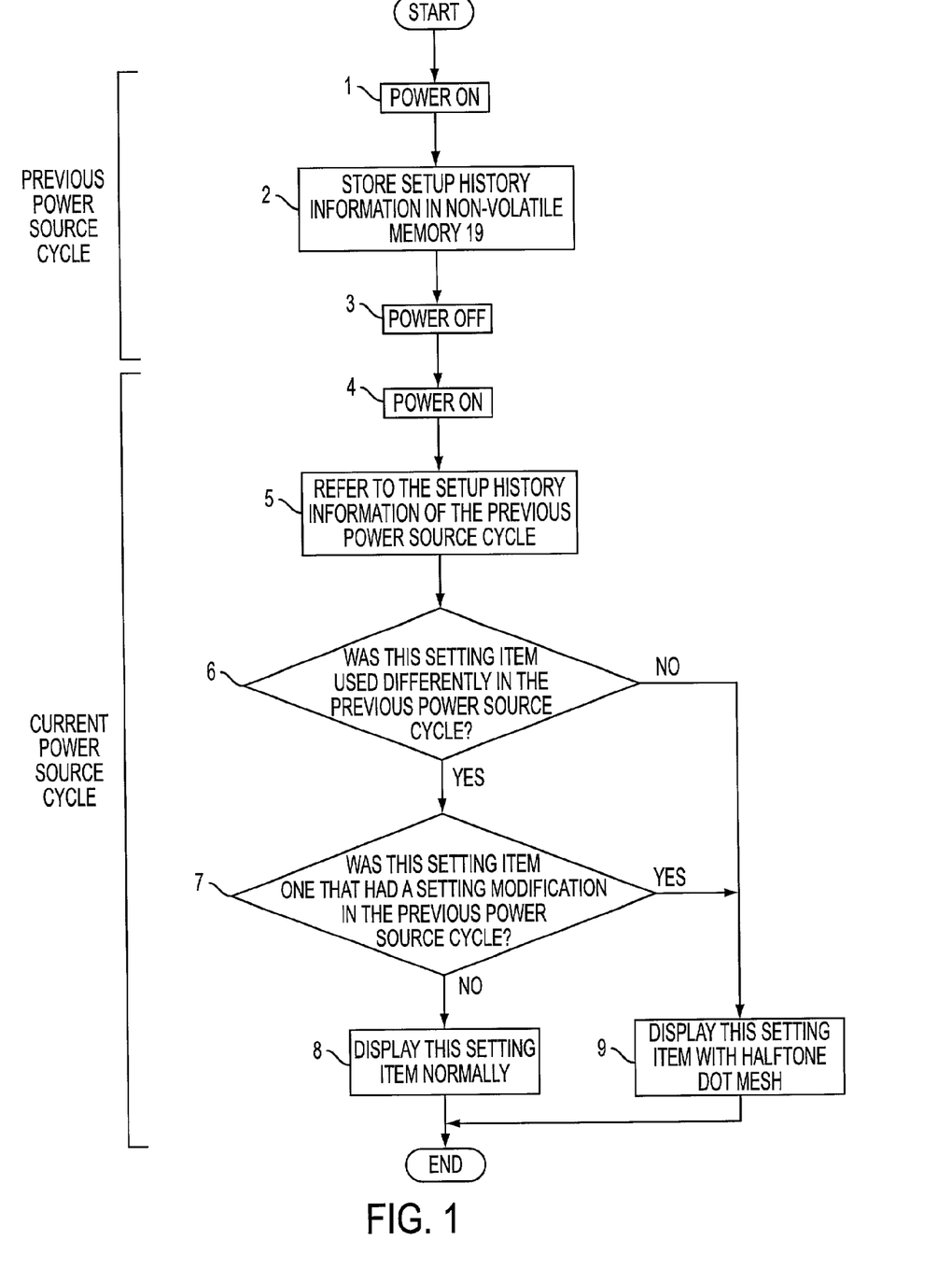
FIG. 1 is a flowchart of an operational process for performing setup for a computer in accordance with embodiments of the present invention.
Figure 2:
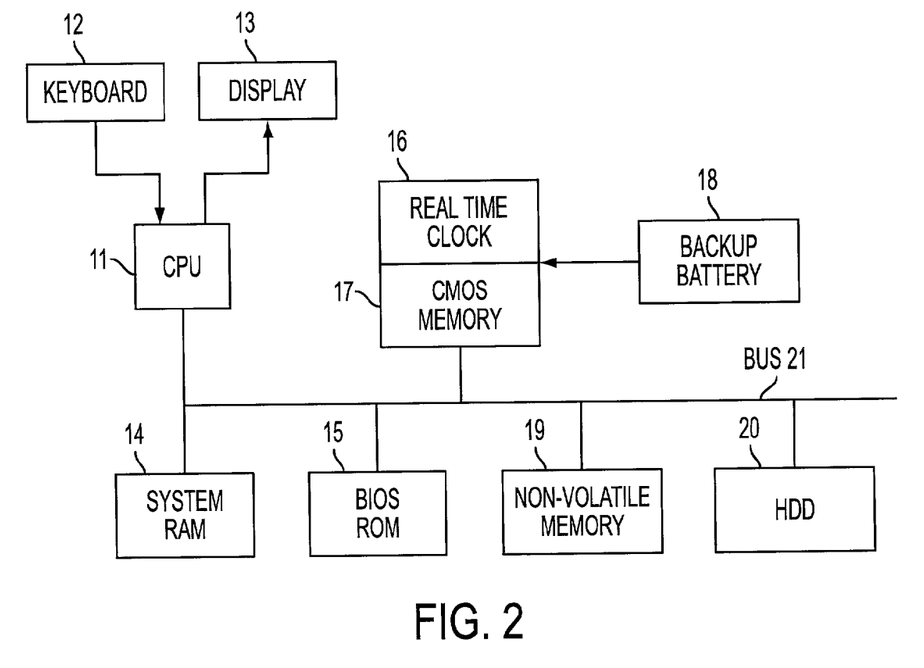
FIG. 2 is a block diagram of a hardware configuration of a computer in accordance with embodiments of the present invention.

FIG. 1 is a flowchart of an operational process for performing setup for a computer in accordance with embodiments of the present invention, and FIG. 2 is a block diagram of computer hardware in accordance with embodiments of the present invention.

As shown in FIG. 2, the computer hardware is mutually connected with a bus 21, and comprises a CPU 11 that controls all systems, a keyboard 12, a mouse (not shown), a display device 13 for display, a system RAM 14 that is the memory used when operating applications, a BIOS ROM 15 in which the BIOS program is stored, a ROM (not shown in the figure), a real time clock 16 operating as a timer, a CMOS memory 17 in which the setting values relating to the BIOS setup are stored, a backup battery 18 that supplies power to the real time clock 16 and CMOS memory 17, a non-volatile memory 19 that stores setup history information, an HDD 20 in which programs, such as the OS and applications, and data are stored, an FDD (not shown in the figure), a CD-ROM driver (not shown in the figure), a communications control device (not shown in the figure), and various interface circuits (not shown in the figure).

The BIOS ROM 15 stores the BIOS program for activation, as previously described. The CPU 11 executes the BIOS program. By executing the BIOS program, the OS that is stored on the HDD 20, and single or multiple drivers for display processing or communications processing, are loaded into the system RAM 14 and various types of processing and management can be executed.

The programs that control the computer are opened in system RAM 14. Then, temporarily stored data for processing, results from the processing of the programs controlling the computer, or the display data for displaying the processing results on the screen of the display 13 are retained, and are used as the operating environment of the CPU 11.

The display data that is opened in the system RAM 14 is transmitted to the display 13 through a graphics board or the like (not shown in the figure). The display contents corresponding to the display data are then displayed on a screen of the display 13.

The HDD 20 records on or reads out from the hard disk, programs, control data, text data, or image data, as instructed by the CPU 11.

The FDD records on or reads out from the floppy disk, programs, control data, text data, or image data, as instructed by the CPU 11.

The CD-ROM driver reads out programs and data recorded on a CD-ROM (not shown), as instructed by the CPU 11.

The communications control device uses communication lines connected to the computer, and transmits data to and receives data from other devices, or downloads programs and data, in accordance with instructions from the CPU 11. The communications control device is, for example, a modem or a network board.

The keyboard 12 comprises a plurality of keys, such as character input keys, cursor keys, etc., and the user uses the keyboard 12 to input data into the computer. The mouse is used to input selection instructions using the mouse cursor displayed on the display 13.

The various programs that are stored in the recording media of the computer, that is, the ROM, the hard disk, the floppy disk, or the CD-ROM, are executed by the CPU 11. Furthermore, the programs and data stored on recording media, such as the hard disk, may be stored in advance or may be downloaded from other devices through the communications lines.

An explanation of a computer in accordance with embodiments of the present invention will now be provided below with reference to the flowchart shown in FIG. 1, using as an example the case when the set time for the auto-suspend timeout function is fifteen (15) minutes on the BIOS setup screen.

The auto-suspend timeout function is a function that erases the display and moves the hard disk to the power saving (suspend) mode when there have been no manipulations from the keyboard during a fixed amount of time. When using Windows 98 as the OS, the auto-suspend timeout function is configured such that the OS automatically conducts power saving control by taking priority over the BIOS settings.

Furthermore, the auto-suspend timeout function is an effective function in computers that support advanced power management standards (referred to hereinafter as "APM standards") that can set the level of power relating to the power source to any of three levels from FULL ON to OFF.

Referring now to the flowchart shown in FIG. 1, in operation 1, the computer power source is turned ON. The BIOS program is triggered by turning on the power in operation 1, and is automatically started in operation 2. The BIOS then executes POST processing to check whether or not memory can correctly read and write. At this time, the BIOS executes the operation 2 processing and executes the initial setup of the hardware using the BIOS setting values that are pre-recorded in CMOS memory 17. The BIOS then executes the initial settings in the hardware, with fifteen (15) minutes as the set time for the auto-suspend timeout function. Thereafter, in operation 2, the BIOS records in the non-volatile memory 19 the presence of a setup use history for the auto-suspend timeout function setting item.

When the BIOS activation processing has been completed, the OS is loaded from the HDD 20 and the OS is activated. During the OS activation processing, the BIOS executes the following operations 10–14, and records in the non-volatile 19 the setup modification history for the auto-suspend timeout function.

Figure 7:
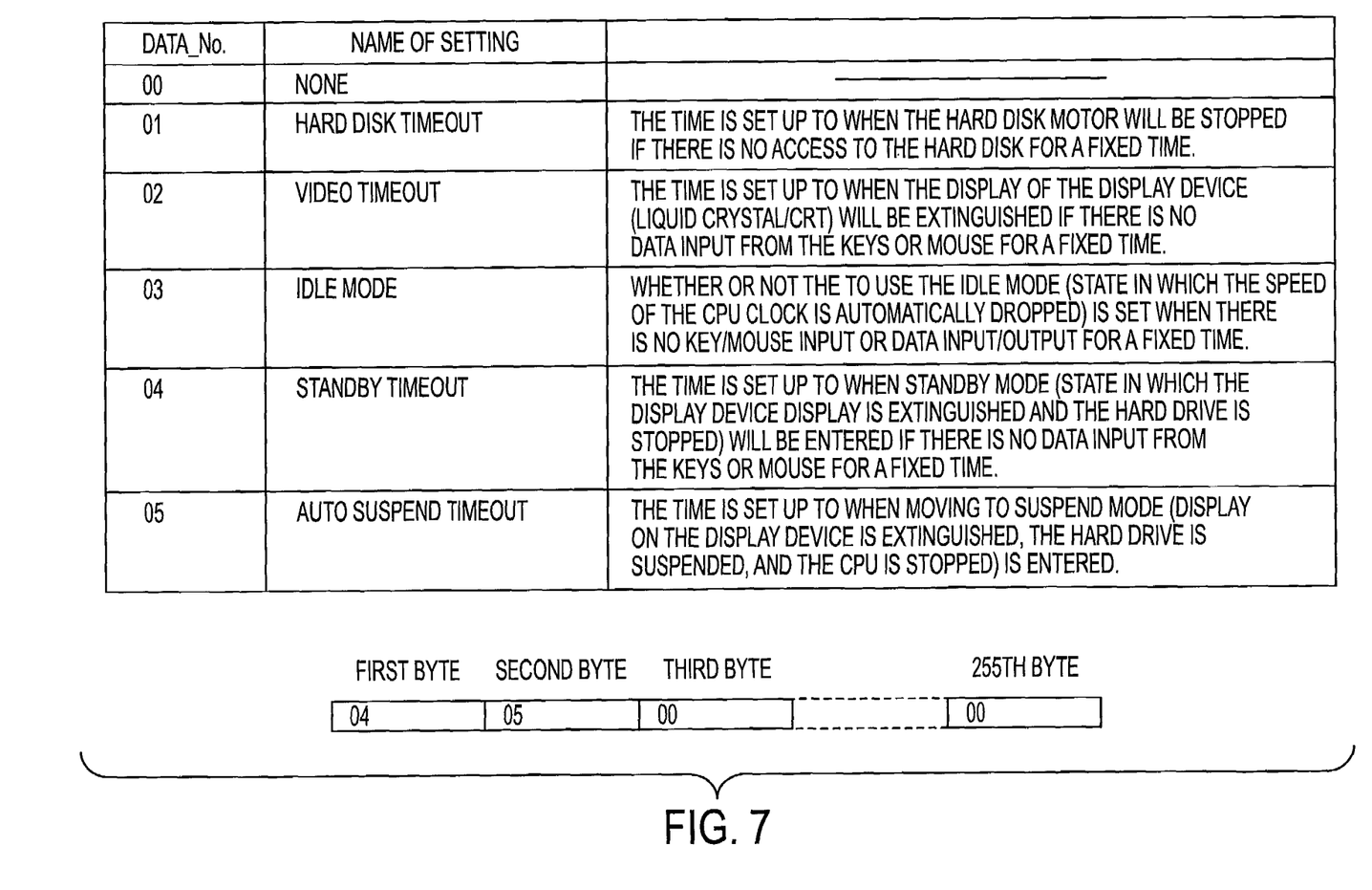
FIG. 7 illustrates a data format stored in a non-volatile memory in accordance with the present invention.

Although not specifically shown in FIG. 7, the auto-suspend timeout function is executed by the following operations 10–17.

In operation 10, the OS sends an APM interface connect command to the BIOS that enables the PC to be optionally suspended. Then, the OS and the BIOS enter a software connection state.

In operation 11, the OS sends a disable power management command to the BIOS, whereby the BIOS disables the setting contents (i.e., 15 minutes) of the auto-suspend timeout function setting that has been executed in relation to the hardware.

In operation 12, the BIOS suspends the standby timer that counts the set time for the standby timeout function under the management of the BIOS in response to the disable power management command from the OS.

As a result of the above operations 10–12, the set time of the auto-suspend timeout function (15 minutes), which is initially pre-set when the BIOS is activated, becomes disabled. Specifically, the setup setting contents that were initially set by the BIOS become modified by the commands from the OS in operations 10–12.

In operation 13, the BIOS records in the non-volatile memory 19 a record of the setup modification history in regard to the settings of the auto-suspend timeout function that were received as a result of the operation 12.

By executing the above-described operations, history information (referred to hereinafter as "setup history information") from the setup execution including the setup use history and the setup modification history, are recorded in the non-volatile memory 19.

The above-described "setup use history" and the "setup modification history" have the data recording format shown in the lower portion of FIG. 7. More particularly, as shown in the table in FIG. 7, identification numbers (Data_No.) corresponding to setup functions are added in advance to the various setup functions (setting items). If there is a setup use history or if there is a setup modification history, the identification number associated with the setup function is recorded in order in the non-volatile memory 19, as shown in the lower portion of FIG. 7.

Furthermore, it is necessary to identify the setup setting items which are setting items that are not reflected. If the setting items that are not reflected are already known, and there has been no modification during each of the power source cycles, then the setup history information is not used. The table that distinguishes the setting items that are not reflected from the other settings (specifically, the enabled settings and the settings that are not enabled) is pre-recorded in the non-volatile memory 19, and based on that table, the setting items that are not reflected may be identified and displayed.

Next, after recording the setup history information in the non-volatile memory 19 the auto-suspend timeout function is operated in the following manner. In operation 14, the OS initiates the standby timer under the management of the OS. After initiating the standby timer, it is confirmed at specific time intervals, such as one minute, two minutes, five minutes, seven minutes, etc., that there has been no input from the keyboard or mouse.

In operation 15, if no input has been received from the keyboard or mouse, the standby timer count advances to the set time of the auto-suspend timeout function. Furthermore, it is assumed that the OS sets the default time for the auto-suspend timeout function to be thirty (30) minutes. When the set time (30 minutes) has elapsed, the OS issues to the BIOS a set power state system standby command to execute standby processing, which is standby processing to save energy.

In operation 16, the BIOS, which has received the set power state system standby command, follows the commands of the OS and performs processing to set the hardware in a power saving mode. As a result, the personal computer device enters the power saving (suspend) state after 30 minutes have elapsed.

Furthermore, the interface control unit 74 and the initialization control unit 76 of the BIOS 73 shown in FIG. 6 include the program for executing operations 10–16, which causes the setup history information to be recorded.

Referring now to FIG. 1, in operation 3, the computer power source is turned OFF, and, in operation 4, the computer power source is again turned ON. The BIOS program automatically starts in operation 5. Then, after the POST processing is executed in the same manner as the previous power source cycle, the BIOS setting values stored in the CMOS memory 17 are followed, and initialization settings relating to the hardware use environment are executed.

If the user wants to confirm or modify the setup setting contents before the OS activation processing is complete, and the OS has begun to be loaded from the HDD 20, an operation is conducted to switch to the mode in which the BIOS setup screen is displayed, causing the BIOS setup screen to be displayed.

When the BIOS setup screen is displayed, the BIOS refers to the BIOS setting values stored in the CMOS memory 17. The setting items that are not reflected are identified and displayed based on the setup history information stored in the non-volatile memory 19 by the operational process described below in operations 6–9, allowing the user to identify these setting items.

In operation 6, the BIOS confirms the setup use history in the non-volatile memory 19. From the setup use history, it is known whether or not any of the initial setting items of the noted setting items were executed in the hardware from the OS during the previous power source cycle, or during the current power source cycle.

In operation 7, the BIOS refers to the setup modification history in the non-volatile memory 19. From the setup modification history, it is determined whether or not there is a history of the noted setting items having been modified into a setting content different from the BIOS setting values stored in the CMOS memory 17 during the previous power source cycle, and based on setting values of software other than the BIOS, such as the OS.

In operation 8, if there is a setup use history for those setting items, and if there is no setup modification history, the setting items are displayed normally.

In operation 9, if there is no setup use history for those setting items, the display locations of those setting items are displayed in half-tone dot mesh. Moreover, if there is a setup use history, and if there is a setup modification history, the display location of that setting is displayed in half-tone dot mesh.

Figure 3:
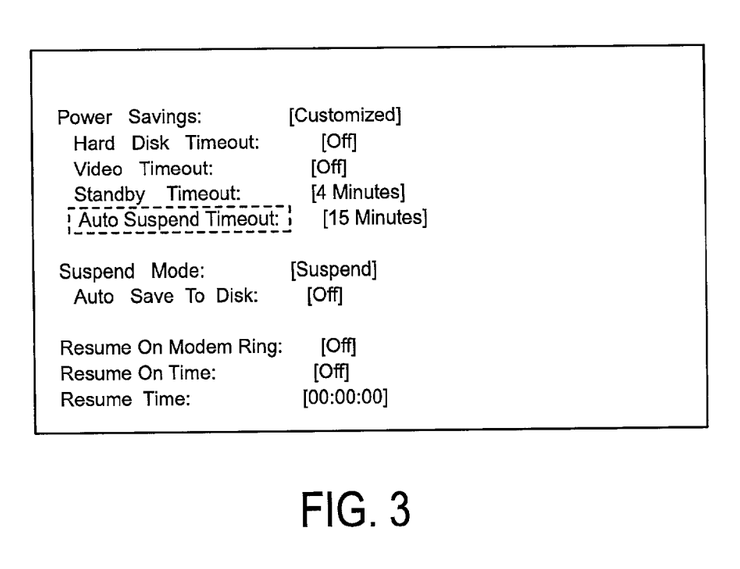
FIG. 3 is an example of a setup screen in accordance with embodiments of the present invention.

In accordance with the present invention, the setup settings of the auto-suspend and standby timeout functions are executed in relation to the hardware from the BIOS during the previous power source cycle, and a use history exists. Because the setting content (15 minutes) of the initial settings that were executed in relation to the hardware from the OS has been modified to disabled, a half-tone dot mesh display, such as shown in FIG. 3, is displayed when displaying the settings.

As described for operations 1–9 above, the settings that are not reflected are displayed in half-tone dot mesh in a state that the user and/or others can recognize. Because the user can recognize the settings that are not reflected, the user and/or others can execute setup setting operations efficiently while paying attention to the setting items that are not reflected.

When the setup setting operation is completed, and the user and/or others saves from the BIOS setting screen and moves to the normal screen, the operational process continues with the previously described operation 2. Thereafter, the OS activation processing starts and the Windows 98 screen is displayed.

It will be recognized by those of ordinary skill in the art that the present invention is not limited to the embodiments described above, and that modifications are possible. For example, the present invention is not limited to the half-tone dot mesh display of the setting items that are not reflected, and displays other than a half-tone dot mesh display may be used. For example, the color of the characters of a setting item may be changed, or the shape of the characters may be changed to italics, etc.

Furthermore, in accordance with embodiments described above, the setup history information and the BIOS setting values are stored in the non-volatile memory 19. However, the setup history information and BIOS setting values may be recorded in the CMOS memory 17, and the non-volatile memory 19 may be omitted. In this case, the hardware configuration is the same as the conventional example shown in FIG. 4.

In addition, in accordance with the embodiments described above, an example was provided in which the setting items that are not reflected are identified and displayed on the BIOS setup screen when the BIOS setting values are overwritten by a setting value from a display screen controlled by the OS. However, the present invention is not limited to identifying and displaying values in this manner, and the setting items that are not reflected may be identified and displayed on the BIOS setup screen when the BIOS setting values are overwritten by a setting value from a display screen controlled by an application.

Furthermore, various modifications of the embodiments of the present invention described above are possible, as described in the following paragraphs.

In accordance with one modification of the present invention, if the setup setting operation is performed from a display screen controlled by the OS, the setting items that are not reflected may be identified and displayed on a display screen controlled by the OS in a recognizable form, such that there is a possibility of overwriting the (setup) setting values that were executed with the setup setting operation from the display screen controlled by the OS using the (setup) setting values set when setup setting operations are executed from the BIOS setup screen.

In accordance with another modification of the present invention, if the setup setting operation is conducted from a display screen controlled by an application, the setting items that are not reflected may be identified and displayed on a display screen controlled by the application in a recognizable form, such that there is a possibility of overwriting the (setup) setting values that were executed with the setup setting operation from the display screen controlled by an application using the (setup) setting values set when setup setting operations are conducted from the BIOS setup screen.

In accordance with another modification of the present invention, if the setup setting operation is conducted from a display screen controlled by a first application, the setting items that are not reflected may be identified and displayed on a display screen controlled by the first application in a recognizable form, such that there is a possibility of overwriting the (setup) setting values that were executed with the setup setting operation from the display screen controlled by the first application using the (setup) setting values set when setup setting operations were conducted from a second application setup screen.

The present invention provides a computer having a setup function, wherein the computer identifies the setting items that are not reflected in the use environment of the computer from among a plurality of setting items, and displays the setting items in a recognizable state.

The present invention provides a computer having a setup function, wherein the computer comprises a memory storing setup history information, and a display controller identifying the setting items that are not reflected in the use environment of the computer from among a plurality of setting items, and controlling display of the setting items in a recognizable state.

The computer memory storing the setup history information is preferably a non-volatile memory.

The computer may replace the setting values set during the setup operation for the setting items that are not reflected by values set by other software that is different from the software used during the setup operation.

The computer may substitute the setting values set for the setting items that are not reflected when the BIOS setup setting operation is conducted in the place of the setting values set when the setup setting operation is conducted from a display screen controlled by the OS.

The present invention provides a computer display method comprising identifying the setting items that are not reflected in the computer use environment from among a plurality of setting items, and displaying the setting items that are not reflected in a recognizable state.

The present invention provides a computer readable storage medium storing a computer program to implement with a computer a method of identifying the settings that are not reflected in the computer use environment from among a plurality of setting items, and displaying the setting items in a recognizable state.

By storing the setup history information in a non-volatile memory, the amount of setup history information that can be saved becomes large. As a result, even if the volume of the conventional CMOS memory in which the BIOS setting values are stored is exceeded, there is the possibility of easily storing the setup history information, and even when the power source is turned off, the recorded content can be maintained without special manipulations, such as a memory data save operation or the like.

In accordance with the present invention, the user and/or others can immediately recognize from the BIOS setup screen, which is conducting setup setting operations, the presence of setting items that are not reflected. Further, the user and/or others can recognize that the setting items that are not reflected are setting items for which the BIOS setting values set when performing the setup setting operation from the BIOS setup screen can be substituted for the setting values set when performing the setup setting operation from a display screen controlled by the OS.

Because the BIOS setup screen is not normally used very often, the fact that the presence of setting items that are not reflected can be immediately recognized on the BIOS setup screen makes it unnecessary to enter several times into an unfamiliar mode, specifically, opening the BIOS setup screen, which is particularly effective.

As a result, the user and/or others are aware that the setting items that are not reflected are items that are also set from a display screen controlled by an OS other than the BIOS software that is used in the setting operation, and the settings can be performed efficiently.

As described above, in accordance with the present invention, setting items having setting values set during the setting operation which are not reflected in the use environment of the computer, are identified and displayed in a recognizable state by storing the setup history information when executing the settings of the use environment, and recalling and using that setup history information as necessary. For this reason, in accordance with the present invention, the user and/or others can easily identify which setting items are enabled and which setting items are not enabled when conducting setup setting operations, allowing the user to effectively conduct correct setup efficiently.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A computer, comprising:
    a setup function setting and display device identifying predetermined setting items among a plurality of setting items based on setup use history during a previous power source cycle, the predetermined setting items having no setup use history or modification history and including items set by an application program; and
    displaying the predetermined setting items in a manner recognizable from other setting items.

2. The computer as recited in claim 1, wherein setting values set during a setup operation for the setting items that are not reflected in the use environment are replaced by values set by software different from the software used during the setup operation.

3. A computer having a setup function, comprising:
    a memory storing setup history information including setting items by an application program; and
    a display controller identifying setting items that are not reflected in a use environment of the computer from a plurality of setting items, and controlling display of the setting items that are not reflected in the use environment in a manner recognizable from other setting items.

4. The computer as recited in claim 3, wherein setting values set during a setup operation for the setting items that are not reflected in the use environment are replaced by values set by software different from the software used during the setup operation.

5. A computer display method, comprising:
    identifying predetermined setting items among a plurality of setting items based on setup use history during a previous power source cycle, the predetermined setting items having no setup use history or modification history and including items set by an application program; and
    displaying the predetermined setting items in a manner recognizable from other setting items.

6. A computer readable storage medium storing a program for implementing a display method with a computer, the method comprising:
    identifying predetermined setting items among a plurality of setting items based on setup use history during a previous power source cycle, the predetermined setting items having no setup use history or modification history and including items set by an application program; and
    displaying the predetermined setting items in a recognizable from other setting items.

7. A computer, comprising:
    a first setup function setting and display device controlled by a first program to set items related to a use environment of the computer and to display the set items;
    a second setup function setting device controlled by a second program to set items related to the use environment of the computer, an item set by the second setup function setting device having priority over the same item set by the first setup function setting device; and
    an identifying device to identify the items set by the second setup function setting device having priority over the items set by the first setup function setting device.

8. The computer as recited in claim 7, wherein the second setup function setting device disables the same item set by the first setup function setting device.

9. The computer as recited in claim 7, further comprising a display to display the item identified by the identifying device in a manner distinguishable from other items.

10. The computer as recited in claim 9, wherein the display displays the item identified in halftone dot mesh.

11. The computer as recited in claim 9, wherein the identifying device comprises a history information setting device to monitor the set items and to store a history of items set by the first setting device which are modified by the second setting device, and the display displays the item in a manner distinguishable from other items based on the stored history.

12. The computer as recited in claim 11, wherein the history information setting device comprises a non-volatile memory storing the history of items set by the first setting device which are modified by the second setting device.

13. The computer as recited in claim 7, wherein the first program is a basic input output system program and the second program is an operating system program.

14. The computer as recited in claim 7, wherein the first program is a basic input output system program and the second program is an application program.

15. The computer as recited in claim 7, wherein the first program is an operating system program and the second program is a basic input output system program.

16. The computer as recited in claim 7, wherein the first program is an application program and the second program is a basic input output system program.

17. The computer as recited in claim 7, wherein the first program is an application program and the second program is an application program.

18. A method of operating a computer, comprising:
setting items related to a use environment of the computer using a first program;
setting items related to the use environment of the computer using a second program, an item set using the second program having priority over the same item set using the first program; and
identifying the items set using the second program having priority over the items set by the first program; and
displaying the identified items in a manner distinguishable from other items.

19. A method of identifying set up items of a computer system, comprising:
maintaining set up history information of the computer system when the computer system executes a set up operation; and
displaying the set up items including values of the set up items set using a software other than a software used during the set up operation based on the stored set up history information.

20. A method of identifying set up items of a computer system, comprising:
configuring a use environment of the computer system responsive to a selection from a display of various setting items indicating status of the setting items by a user without requiring direct use of a BIOS setup screen executed by the computer, wherein values of the configured use environment are subsequently displayed with the various setting items and include items set by an application program in a previous power source cycle that are disabled in a current power source cycle.

* * * * *